United States Patent [19]
Reid

[11] Patent Number: 6,109,355
[45] Date of Patent: Aug. 29, 2000

[54] TOOL STRING SHOCK ABSORBER

[75] Inventor: Michael Reid, Aberdeen, United Kingdom

[73] Assignee: PES Limited, Dyce, United Kingdom

[21] Appl. No.: 09/121,406

[22] Filed: Jul. 23, 1998

[51] Int. Cl.[7] .................................................. E21B 23/00
[52] U.S. Cl. ...................... 166/380; 166/297; 166/242.7; 175/321
[58] Field of Search .................................. 166/55.1, 297, 166/242.7, 241.1, 381, 240, 333.1, 373, 380; 175/4.54, 27, 56, 106, 321, 322

[56] References Cited

U.S. PATENT DOCUMENTS

| | | | |
|---|---|---|---|
| 3,556,268 | 1/1971 | Fister | 188/268 |
| 3,653,468 | 4/1972 | Marshall | 188/1 C |
| 3,949,150 | 4/1976 | Mason et al. | 175/321 |
| 4,162,619 | 7/1979 | Nixon, Jr. | 64/23 |
| 4,173,130 | 11/1979 | Sutliff et al. | 64/23 |
| 4,246,765 | 1/1981 | Zabcik | 64/23 |
| 4,394,884 | 7/1983 | Skipper | 175/321 |
| 4,552,230 | 11/1985 | Anderson et al. | 175/321 |
| 4,679,669 | 7/1987 | Kalb et al. | 188/375 |
| 4,997,037 | 3/1991 | Coston | 166/105 |
| 5,462,140 | 10/1995 | Cazort et al. | 188/275 |
| 5,509,475 | 4/1996 | Lewis | 166/68 |

*Primary Examiner*—Eileen Dunn Lillis
*Assistant Examiner*—John Kreck
*Attorney, Agent, or Firm*—Paul I. Herman; Alan J. Atkinson

[57] ABSTRACT

An apparatus and method for absorbing shock downhole in a wellbore. The kinetic energy from a moving tool is absorbed to dissipate such energy, to decelerate the moving tool, or to prevent impact damage from contact between the tool and other downhole components. An actuator has an interference fit with a body such as the interior wall of a tubing section. When the moving tool actuates the actuator to move the actuator relative to the body, kinetic energy is dissipated into the body as the body elastically deforms due to the moving actuator. The amount of energy dissipated can be determined from the strength of the body, the contact dimensions between the actuator and body, and the length of moving contact between the actuator and body.

15 Claims, 1 Drawing Sheet

TOOL STRING SHOCK ABSORBER

BACKGROUND OF THE INVENTION

The present invention relates to the field of tool strings lowered downhole in wellbores. More particularly, the invention relates to a shock absorber for minimizing the impact of a tool string against other well equipment located downhole in a wellbore.

Shock absorbing devices have been developed to attenuate vibration and to reduce impact forces between tools, tool strings, and other equipment located downhole in a wellbore. Conventional shock absorbers use springs, elastomers, fluid dampening chambers, shear pins, and other devices to reduce impact forces. One specific application of a shock absorbing system requires protection for lubricator ball valves located downhole in a wellbore. Lubricator valves are located several thousand feet below the wellbore surface to seal the wellbore and to selectively permit the passage of tool strings such as perforating guns. Perforating gun strings can extend for hundreds of feet to facilitate the completion of horizontal and deviated wellbores. If a perforating gun string is accidentally released to fall into the wellbore, impact with the lubricator valve can severely damage the ball valve and delay future well operations.

One technique for reducing shock impacts uses shear pins or metal cutting devices to provide resistant forces. U.S. Pat. No. 4,679,669 to Kalb et al. (1987) disclosed a wireline shock absorber having a movable mandrel attached to carbide cutting elements. Shock was absorbed by the metal cutting elements, and the cross-sectional area of the cutting surface and the rake angle were altered to modify the desired resistance forces. In U.S. Pat. No. 5,566,772 to Coone et al. (1996), shear pins selectively permitted movement between inner and outer tubulars of a casing joint as the casing joint was landed in a wellbore. In U.S. Pat. No. 3,653,468 to Marshall (1972), a cutter bar sheared washer projections to reduce the shock against instruments dropped into a wellbore.

Shock absorbing systems are used in wellbore production strings such as pump sucker rods to reduce shock loads to the production equipment. As disclosed in U.S. Pat. No. 4,997,037 to Coston (1991), coiled springs protected moving components against shock loads. In U.S. Pat. No. 5,509,475 to Lewis (1996), a compression cushion and sleeve absorbed sucker rod stresses. In U.S. Pat. No. 3,923,105 to Lands (1975), elastomeric materials provided cushions between multiple guns in a perforating string.

Shock absorbing systems are also used in drilling strings to protect the drill bit and other drill string components. Such systems typically use springs and fluid dampening systems. U.S. Pat. No. 4,223,746 to Tanguy et al. (1980) disclosed a shock limiting apparatus having a hydraulic dampening device. When the deceleration reached a predetermined level, a device incrementally increased the frictional drag to dissipate kinetic energy. U.S. Pat. No. 3,947,008 to Mullins (1976) disclosed torsion tube springs for absorbing longitudinal shock loads. U.S. Pat. No. 4,246765 to Zabcik (1981) disclosed ring springs for providing shock absorption in a drilling string assembly, and U.S. Pat. No. 3,963,228 to Karle (1976) disclosed a coil spring for absorbing shock loads. U.S. Pat. No. 4,194,582 to Ostertag (1980) disclosed a double acting drill string shock absorber using springs for the return forces. U.S. Pat. No. 4,394,884 to Skipper (1983) disclosed a shock sub having inner and outer telescoping sleeves and a two chamber fluid damping system connected with a fluid carrying aperture. In U.S. Pat. No. 4,901,806 to Forrest (1990), axial forces in a drill string were dampened with dual pistons having corresponding fluid chambers. U.S. Pat. No. 4,055,338 to Dyer (1977) incorporated a lubricating passage between pressurized gas in one chamber and a liquid in another chamber to provide shock absorption. U.S. Pat. No. 4,133,516 to Jurgens (1979) disclosed a pressure equalizing piston for absorbing forces drilling operations. U.S. Pat. No. 4,552,230 disclosed a combination mechanical and hydraulic dampening system.

Other concepts have been proposed to provide axial load dampening or shock absorbing characteristics. U.S. Pat. No. 5,083,623 to Barrington (1992) disclosed telescoping concentric cylinders forming sealed chambers. Shock forces were cushioned by the metered movement of fluid from one chamber to another. Coil springs were also proposed to provide shock absorption. In U.S. Pat. No. 4,162,619 to Nixon et al. (1979), a drill string shock sub absorbed axial loads with a spring formed with a knitted wire fabric or rope compressed in to a compact mass. In U.S. Pat. No. 4,173,130 to Sutliff et al. (1979), a drill string shock absorbing sub was formed with polyurethane pellets contained in a lubricating liquid. In U.S. Pat. No. 5,133,419 to Barrington (1992), nitrogen gas or silicon oil was incorporated within the annular chambers of a metering piston to provide shock absorption. U.S. Pat. No. 4,817,710 to Edwards et al. (1989) disclosed resiliently mounted contact pads for providing a cushion in a tool string, and U.S. Pat. No. 4,693,317 to Edwards et al. (1987) disclosed compressible members for providing a shock absorbing system. In U.S. Pat. No. 5,183,113 to Leaney et al. (1993), a downhole decelerator used a plunger within the mud carrying casing. When the plunger nose impacted the landing plate, mud was pushed out of a chamber to decelerate the device.

The shock absorbing performance of conventional systems is limited by the mechanical characteristics of the devices, and the dynamics of fluid contained in the systems. A need exists for a reliable shock absorbing system which can fit within the narrow confines of a wellbore and which can absorb large amounts of kinetic energy.

SUMMARY OF THE INVENTION

The present invention provides an apparatus for absorbing energy from a tool moving downhole in a wellbore. The apparatus comprises an elastically deformable body located downhole in the wellbore, and an actuator engagable with the tool for moving relative to the body and for deforming said body to absorb kinetic energy from the tool. In different embodiments of the invention, the actuator can move relative to a stationary body, or the body can move relative to a stationary actuator. The body can comprise a hollow tubular, and the actuator can be configured to uniformly deform the body as the actuator moves relative to the hollow tubular wall surface. In a preferred embodiment of the invention, the actuator elastically deforms the body and permits the body to return to the initial configuration after the kinetic energy has been absorbed.

The method of the invention comprises the steps of positioning an actuator in contact with an elastically deformable body, of positioning the body downhole in the wellbore, and of moving the actuator relative to the body to deform said body to absorb kinetic energy from the moving tool. The dimensions of the actuator and body and the length of movement therebetween can be determined for the absorption of a selected quantity of kinetic energy.

DESCRIPTION OF THE PREFERRED EMBODIMENTS

Figure 1:
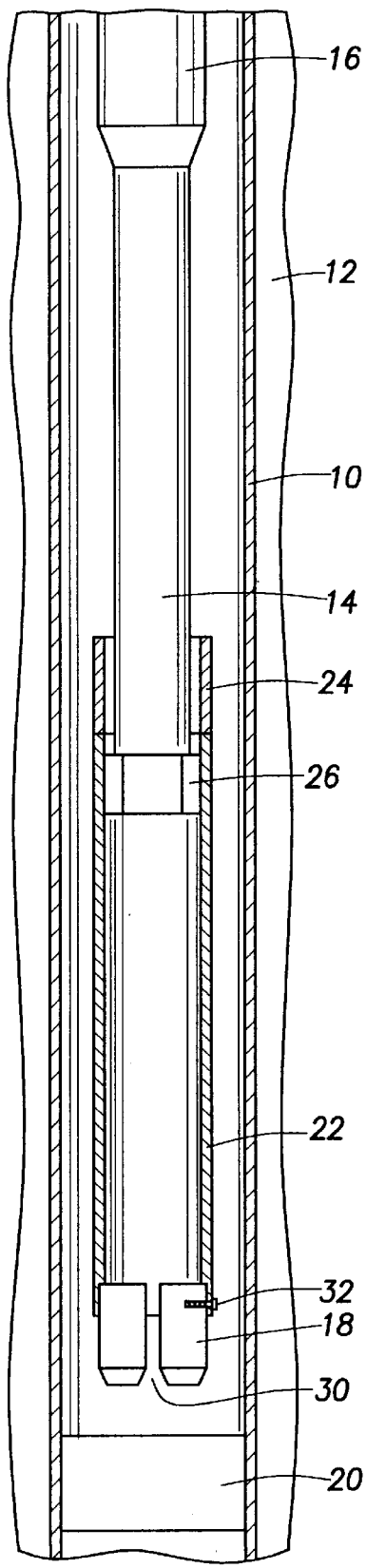
FIG. 1 illustrates a shock absorber in an initial position.
Figure 2:
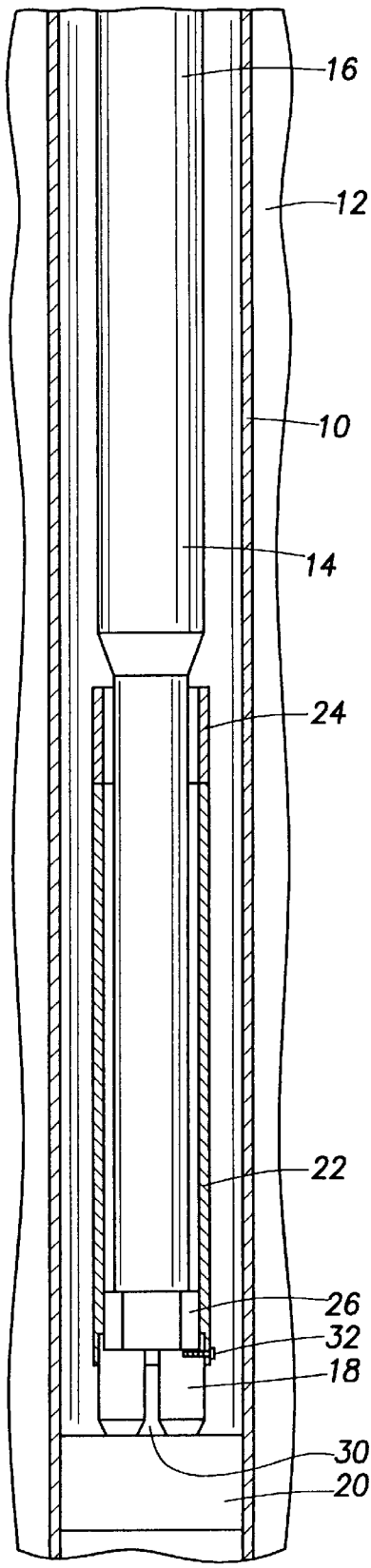
FIG. 2 illustrates the shock absorber after the actuator element is moved relative to the tubing body.

The present invention provides a unique shock absorber which uses the hoop strength in an elastic body to provide a restoring force resisting movement of a tool moving downhole in a wellbore. Tubing 10 is positioned in wellbore 12 and can be located thousands of meters from the wellbore 12 surface. Plunger body 14 is attached to a wireline, coiled tubing length, perforating gun string, or other well tool 16 for movement within tubing 10. As plunger body 14 is lowered in tubing 10, bottom sub 18 contacts a stop such as lubricator valve 20 positioned downhole in wellbore 12. Lubricator valve 20 isolates different zones within wellbore 12 from fluid migration and provides safe well control over pressurized fluids located within downhole within wellbore 12. Bottom sub 18 is attached to elastically deformable body 22, body 22 is attached to connector 24, and plunger body 14 is attached to plunger interference ring 26 through a threaded connection or other attachment.

Plunger interference ring 26 has an exterior dimension greater than the interior dimension of deformable body 22. Such interference fit exerts a force radially outward which elastically deforms body 22 radially outwardly along a contact line defined by the contact points between body 22 and ring 26. Such contact line can comprise one or more surfaces having different shapes, dimensions and configurations. When bottom sub 18 contacts valve 20, plunger body 14 and plunger interference ring move downwardly relative to deformable body 22. Because of the interference fit between ring 26 and body 22, frictional resistance force and energy dissipation forces resisting such movement is provided to perform energy dissipating work. This combined resistance force can be used to dissipate kinetic energy, to decelerate movement of plunger body 22, and to provide various shock absorption functions.

As shown in FIG. 1, ring 26 comprises a cylindrical member having a slightly greater diameter than the interior bore of body 22. This interference fit allows ring 26 to elastically expand body 22 as ring 26 is forced downwardly through body 22. The resulting pressure between ring 26 and body 22 can be equated back to a normal force based on the area of contact, acting perpendicular to the direction of motion. Using this normal force in conjunction with a suitable friction factor, the resistance force can be calculated. The product of the resistance force and the stroke length of ring 26 movement relative to body 22 provides the energy absorbed during such movement.

The energy absorbed by the movement of ring 26 can be designed or otherwise selected to equal the amount of energy necessary to decelerate a moving tool such as plunger body 14 and other attached components. A representative example is the lowering of perforating guns, attached at the lower end to plunger body 22, into wellbore 12. If the perforating gun string was accidentally dropped, the lower end of such string would impact valve 20. To design the shock absorbing capability necessary to dissipate the kinetic energy of the moving perforating gun string, the value of interference necessary to absorb such kinetic energy can be calculated. A typical value for energy absorption at impact would approximate 50,000 Joules. The calculated dimensions necessary to absorb such energy for a 3.5 inch outside diameter ring 22 would be an open length of 80.0 inches and a closed length of 41.0 inches.

As used herein, references to shock absorption refers to the dissipation of kinetic energy, deceleration of moving components, or protection of components from impact damage. "Absorption" is used in the context of transferring kinetic energy from a moving element and dissipating such kinetic energy for the purpose of diffusing such kinetic energy, for decelerating a moving component, or for impact shock mitigation. Absorption can mean the reception of an impact without recoil, and can further refer to the assimilation or transfer of kinetic energy from a moving component to another component.

Tests of the invention have demonstrated that if the hoop stresses within body 22 are maintained within the yield stress of the body 22 material and configuration, the section of body 22 in contact with ring 26 along the contact line will simply expand body 22 outward as ring 22 passes through such section. After ring 22 has passed, the section of body 22 will elastically recover to the original size and configuration and can be used again with negligible deterioration in performance.

For a cylindrical ring 26 as illustrated, the amount of energy dissipated can be modified by changing the interference between ring 26 and body 22, or by changing the length of ring 26 to modify the area in contact with body 22, or by changing the length of stroke or movement of ring 26 relative to body 22. Each of these variables affects the work performed by the invention, and the corresponding energy absorbed or dissipated.

Bottom sub 18 can be formed with a material such as brass to lessen potential impact damage with well tools such as valve 20. Upon impact, the softer brass material deforms to cushion the impact and to deform around the shape of the downhole tool. If the invention is used within a fluid filled wellbore, fluid bypass port 30 can be positioned in bottom sub 18 and through ring 26 to permit fluid flow through the interior of such elements. Although body 22 can be shaped in different configurations formed with one or more components, connector 24 is illustrated as being attached to body 22 to centralize and to guide movement of plunger body 14. Set screw 32 can attach body 22 to bottom sub 18.

Figure 3:
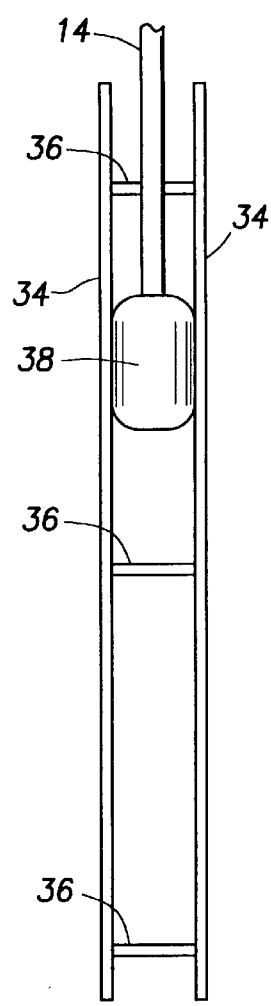
FIG. 3 illustrates a different form of shock absorbing body.

Although body 22 is illustrated as a cylindrical structure, the elastic body of the invention can have different shapes having ovals, rectangles, triangles, and other cross-sectional dimensions. The perimeter of the body does not have to be continuous, and could comprise structures as different as two parallel metal strips 34 retained with rings 36 in a selected orientation as shown in FIG. 3. Plunger body 14 is attached to ring 38 which can be configured in different shapes suitable for deforming a body such as metal strips 34 to accomplish the functions provided by the invention.

The impact from falling well tools such as perforating guns can be determined from variables such as the casing inside diameter, the gun outside diameter, the projected area of the guns, the weight and length of the guns, projected diameter of the shock absorbing system and projected area of any skirt, the density and viscosity of fluid displaced in the wellbore, the coefficient of drag, a friction and loss K-factor, and the acceleration due to gravity. From this data, the terminal velocity of the falling perforating guns can be calculated using techniques known in the art, and the kinetic energy K can be determined as follows:

$$K = \frac{m(V_1)^2}{2}$$

To calculate the buckling load for the invention components, the following relationships and examples are illustrative.

| Variables | |
|---|---|
| Diameter of rod ($D_r$) | $D_r = 2.5 \times \frac{25.4}{1000}$  Dr = 0.064 |
| Inside diameter of rod ($d_r$) | $d_r = 0 \times \frac{25.4}{1000} = 0$ |
| Outside diameter of body ($D_b$) | $D_b = 3.5 \times \frac{25.4}{1000} = 0.089$ |
| Inside diameter of body ($d_b$) | $d_b = 3.275 \times \frac{25.4}{1000} = 0.083$ |
| Mode of buckling constant | u = 0.5 |
| Young's Modulus or Modulus of Elasticity | E = 210 × 10$^9$ |
| Length of Rod | $L_r = 64 \times \frac{25.4}{1000} = 1.626$ |
| Length of Body | $L_b = 47 \times \frac{25.4}{1000} = 1.194$ |

| Calculation of Buckling Load | |
|---|---|
| 2$^{nd}$ Moment of Rod Area ($I_r$) | $I_r = \frac{\pi(D_r)^4 - (d_r)^4}{64} = 7.981 \times 10^7$ |
| 2$^{nd}$ Moment of Area ($I_b$) | $I_b = \frac{\pi[(D_b)^4 - (d_b)^4]}{64} = 7.156 \times 10^7$ |
| Buckling Load for Rod - Euler ($P_r$) | $P_r = \frac{u^2 \times \pi^2 \times E \times I_r}{(L_r)^2} = 1.565 \times 10^5 N$ |
| Buckling Load for Body - Euler ($P_b$) | $P_b = \frac{u^2 \times \pi^2 \times E \times I_b}{(L_b)^2} = 2.602 \times 10^5 N$ |

To determine the interference fit required in a shock absorber system, the following variables and calculations are representative for one embodiment of the invention.

| Variables | |
|---|---|
| Outside shock absorber radius | $R_1$ = 1.75 inches |
| Inside shock absorber body radius | $R_2$ = 1.378 inches |
| Outside radius of shock absorber piston | $R_3 - R_2$ |
| Stroke length of shock absorber | $L_1$ = 39.37 inches |
| Piston length | $L_2$ = 0.029 m |
| Interference pressure | p = 1.305 × 10$^4$ psi |
| Young's Modulus | E = 210 × 10$^9$ |
| Poisson's Ratio | v = 0.3 |
| Coefficient of Friction | u = 0.1 |

Calculations

Hoop Stress ($\sigma_1$) not to exceed 5.515×10$^8$ N/m$^2$

Calculations

Hoop Stress ($\sigma_1$) not to exceed 5.515 × 10$^8$ N/m$^2$ $$\sigma_1 = \frac{1}{(R_1)^2}\left[\frac{p}{\left[\frac{1}{(R_2)^2} - \frac{1}{(R_1)^2}\right]}\right] - \frac{1}{(R_2)^2}\left[\frac{p}{\left[\frac{1}{(R_2)^2} - \frac{1}{(R_1)^2}\right]}\right]$$

$$\sigma_1 = 3.837 \times 10^8 \text{ N/m}^2 = 5.565 \times 10^4 \text{ psi}$$
$$\sigma_1 = 3.837 \times 10^8 \text{ N/m}^2 = 5.565 \times 10^4 \text{ psi}$$

-continued

| Calculations | | |
|---|---|---|
| Interference above common diameter | $U_1 = \dfrac{R_2[\sigma_1 - v(p)]}{E} \dfrac{1000}{25.4}$ | $= 0.003$ inches |
| Interference below common diameter | $U_2 = \dfrac{R_3[p - v(p)]}{E} \dfrac{1000}{25.4}$ | $= 4.134 \times 10^4$ inches |
| Total inference | $S = 2(U_1 - U_2) = 0.006$ inches | |
| Frictional force required to insert | $F = \dfrac{u(p \times 2 \times \pi \times R^2 \times L^2)}{4.448}$ | $= 1.29 \times 10^4$ pounds force |
| Energy Absorbed | $K = F \times 4.448 \times L_1 = 5.74 \times 10^4$ Joules | |

The method of the invention absorbs energy from a tool moving downhole in a wellbore. The method comprises the steps of positioning an actuator such as ring 26 in contact with an elastically deformable body such as body 22, positioning body 22 downhole in the wellbore, and of moving ring 26 relative to body 22 to deform body 22 to absorb kinetic energy from the moving tool engaged with ring 26. In various embodiments of the method, body 22 can be positioned stationary within the wellbore, or ring 26 can be stationary within the wellbore as body 22 is engaged with the tool to move body 22 relative to ring 26. The dimensions of ring 26 and of body 22 can be determined to select the amount of energy absorbed, and the material composition, surface texture, and length of travel also can be selected to determine the energy absorbing capabilities. Because ring 26 as illustrated is in contact with body 22 along a contact surface or contact line, the deformation of body 22 will occur along such contact line as ring 26 moves relative to body 22. The surface area comprising such contact line also affects the energy levels absorbed as described above. Although a preferred embodiment of the invention elastically deforms body 22 to permit uninhibited use of body 22, and to permit reuse of such component in another shock absorbing cycle, body 22 can be inelastically deformed to provide single shot shock absorption capabilities.

Body 22 can be integrated into the same assembly as plunger body 14 and ring 26, or can be configured separately for engagement during operation. In a preferred embodiment of the invention, ring 26 is initially positioned in the hollow interior of body within a section having a greater interior dimension than the outer dimension of ring 26. This feature facilitates installation, and positions ring 26 to engage the narrower confines of body 22 during impact therebetween.

The invention is well suited to absorbing large quantities of energy. By using the elastic properties of body 22 as the medium for energy absorption, energy levels can be absorbed which would not be possible for conventional shock absorbing systems using springs or viscous fluids. The invention permits such energy absorption in a small space which is particularly suitable for the confines downhole in wellbores. The invention is simple to manufacture and operate, is compact and versatile. Because galling or metal shearing between ring 26 and body 22 is avoided for the elastic embodiment of the invention, permanent damage to the components is prevented.

Although the invention has been described in terms of certain preferred embodiments, it will become apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. An apparatus for absorbing energy from a tool moving downhole in a wellbore, comprising:

an elastically deformable body located downhole in the wellbore, wherein said body comprises a tubular member having a hollow interior defined by an interior wall surface; and an actuator engagable with the tool for moving relative to said body and for deforming said body to absorb kinetic energy from the tool.

2. An apparatus as recited in claim 1, wherein the hollow interior of said tubular member is cylindrical.

3. An apparatus as recited in claim 1, wherein said actuator contacts said interior wall surface.

4. An apparatus as recited in claim 1, wherein said actuator comprises a plunger attached to a deformation ring for contacting and for deforming said body as said plunger and said deformation ring move relative to said body.

5. An apparatus as recited in claim 1, wherein said body has a cross-sectional dimension, and wherein said actuator is configured to uniformly deform said body across said cross-sectional dimension.

6. An apparatus as recited in claim 1, wherein said actuator is capable of elastically deforming said body without permanently deforming said body.

7. An apparatus as recited in claim 1, wherein said actuator is capable of absorbing said kinetic energy by inelastically deforming said body.

8. An apparatus as recited in claim 1, wherein said actuator is stationary relative to the wellbore, and wherein said body is moveable relative to said actuator.

9. An apparatus as recited in claim 1, wherein said body is stationary relative to the wellbore, further comprising a stop attached to said body for limiting movement of said actuator relative to said body.

10. An apparatus for absorbing energy from a tool moving downhole in a wellbore, comprising:

an elastically deformable body located downhole in the wellbore; and an actuator engagable with the tool for moving relative to said body and for deforming said body to absorb kinetic energy from the tool, wherein said actuator contacts said body along a selected contact surface, and wherein actuator has a dimension greater than a dimension of said body along said contact surface for deforming said body as said actuator moves relative to said body along said contact surface.

11. A method for absorbing energy from a tool moving downhole in a wellbore, comprising the steps of;

positioning an actuator in contact with an elastically deformable body;

positioning said body downhole in the wellbore;

positioning said actuator in a stationary position relative to the wellbore; and engaging said body with the moving tool to move said body relative to the stationary actuator to deform said body to absorb kinetic energy from the moving tool.

12. A method for absorbing energy from a tool moving downhole in a wellbore, comprising the steps of:

positioning an actuator in contact with an elastically deformable body;

positioning said body in a stationary position downhole in the wellbore; and moving said actuator relative to said body to deform said body to absorb kinetic energy from the moving tool, wherein said actuator elastically deforms said body to absorb kinetic energy and each section of said body elastically returns to the same configuration after said actuator moves relative to said body.

13. A method for absorbing energy from a tool moving downhole in a wellbore, comprising the steps of:

positioning an actuator in contact with an elastically deformable body;

determining selected dimensions of said actuator and of said body;

determining movement between said actuator and said body necessary to absorb a selected quantity of kinetic energy;

positioning said body in a stationary position downhole in the wellbore; and moving said actuator relative to said body to deform said body to absorb kinetic energy from the moving tool.

14. A method for absorbing energy from a tool moving downhole in a wellbore, comprising the steps of:

positioning an actuator in contact with an elastically deformable body;

positioning said body in a stationary position downhole in the wellbore; and moving said actuator relative to said body to inelastically deform said body to absorb kinetic energy by permanently deforming said body.

15. A method for absorbing energy from a tool moving downhole in a wellbore, comprising the steps of:

positioning an actuator in contact with an elastically deformable body;

positioning said body downhole in the wellbore; and moving said actuator relative to said body to deform said body to absorb kinetic energy from the moving tool wherein said actuator contacts said body along a contact line, and wherein said actuator uniformly deforms said body along said contact line.

* * * * *